Sept. 8, 1942.    M. SKOLNIK    2,294,940
MIRROR BACKING
Filed Feb. 17, 1940

INVENTOR
Max Skolnik
BY Evans + McCoy
ATTORNEYS

Patented Sept. 8, 1942

2,294,940

UNITED STATES PATENT OFFICE 2,294,940

MIRROR BACKING

Max Skolnik, Chicago, Ill.

Application February 17, 1940, Serial No. 319,469

3 Claims. (Cl. 88—105)

This invention relates to a method for backing or reinforcing sheets or plates of glass and the like, and to the articles produced thereby.

It is well known that when sheets or plates of glass are subjected to greatly changing atmospheric conditions, such as in swimming pools, bathrooms, etc., or are used in exposed positions where there are great temperature changes, fracture may occur in the glass, and if the object is a mirror, the silver plating on the glass may be frequently impaired. Coating materials, such as hard varnish, have been heretofore used over the silvered surface of relatively heavy mirrors which do not have a backing or reinforcing material cemented thereon. Such coatings have not been generally successful on mirrors having a reinforcing backing adhesively attached thereto. In some cases reasons for such failure may be that the backing used had a considerably different expansion coefficient from the glass or that the coating over the mirror was not sufficiently flexible to compensate for the relative movements. In other cases the backing and the coating or adhesive over the mirrored surface may be too pervious to water, the coating itself may have a tendency to shrink on aging, or the coating may not be of uniform thickness at all points over the silvered surface so as to uniformly compensate for expansion.

It is an object of this invention to provide a glass sheet or plate having a reinforcing backing with a uniform coating of adhesive material which is impervious to moisture, and which has sufficient flexibility to compensate for atmospheric changes.

It is another object of this invention to provide a method for making mirrors having a backing attached thereto with a uniform coating of flexible, liquefiable adhesive.

It is another object of this invention to provide a mirror having a backing which in itself is substantially unaffected by water and which is attached to the silvered surface of the mirror with a flexible layer of impervious material.

Other objects will be apparent from the following description of the invention as illustrated by the accompanying drawing, where:

Figure 1:
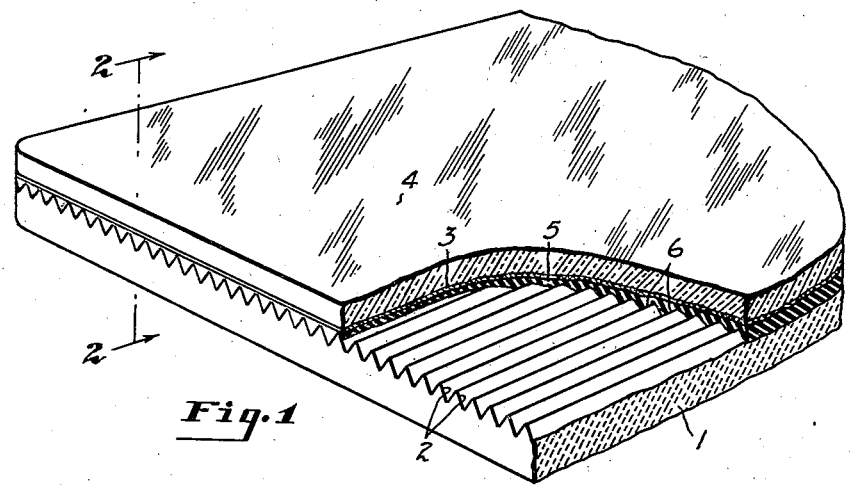
Figure 1 is a perspective view of my improved mirror with a portion of the glass and adhesive, impervious material removed to show the grooved surface of the backing.
Figure 2:
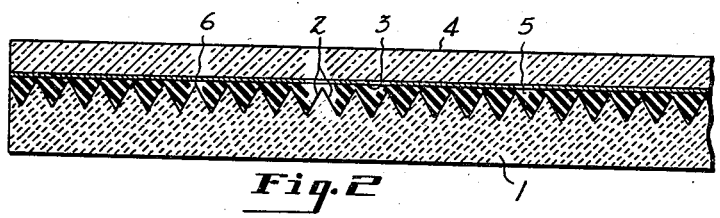
Fig. 2 is a section on the line 2—2 of Fig. 1.

Referring more particularly to the drawing my invention is illustrated as a mirror which comprises a backing member 1 which preferably has a corrugated or grooved surface 2 is fastened to the silvered surface 3 of the transparent material or glass 4 by a meltable, water impervious, organic solid 5.

The backing plate 1 should be a rigid material that is relatively water resistant, and it is preferred that it have a coefficient of expansion near that of glass. Ceramic, resinous and plastic materials generally may be used for the backing, but I have found that backing materials formed from magnesium oxychloride cements have exceptional characteristics in that they have high strength and a thermal expansion comparable with glass; they are relatively smooth; they may be molded in any desired shape; they may incorporate pigments and be made highly decorative; and, when desired, they may be applied to the glass or mirror in the plastic condition.

The adhesive 5 to be applied in contact with the surface of the glass or the silvered surface 3 thereof, including any protective coatings, such as shellac or varnish, is an important feature of my invention. Bituminous materials or asphalts have desirable characteristics for use an as adhesive. Materials can be readily applied in a warm or flowable condition, and, when cold, while having the general characteristics of a solid, are still relatively highly viscous and will yield sufficiently under stress to compensate for slight relative movements of the glass backing. Such bituminous materials adhere well to the coated or uncoated glass and to the surface of the reinforcing backing. While such bituminous materials are preferred, other high melting, amorphous materials, such as the higher melting point waxes, hydrocarbons, etc., may also be used. The materials should have a liquefying point higher than the highest temperatures to be encountered in use, and, preferably, should be about 200° F. or higher. The adhesive 5 should have an effective thickness which is sufficient to permit the relative movement between parts due to atmospheric changes without strain sufficient to rupture the silvered coating on the mirror or fracture other components of the mirror assembly. When, as in Fig. 3, the surface of the backing member is relatively flat, a thickness of at least $\frac{1}{32}$" is usually required, and it preferably should be about $\frac{1}{16}$" to about $\frac{1}{8}$", the minimum effective thickness of the layer, of course, depending on the size of the mirror and upon the relative coefficients of expansion of the parts.

Figure 3:
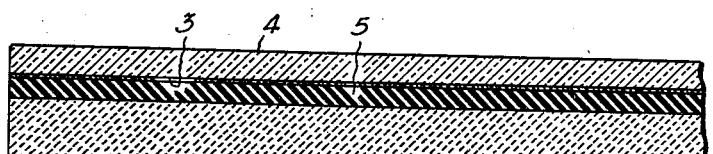
Fig. 3 is a sectional view of a modification of my mirror having a uniform coating of impervious, protective and adhesive material applied between the silvered surface and a backing having a smooth surface.

In order to properly reinforce and protect the mirror, the adhesive should provide a surface complemental to the silvered surface of the mirror and should establish contact between all points of the mirror and the backing. While a thin layer of an adhesive having a flat surface may readily be produced on flat backing members, sufficiently flat layers of a substantial thickness and with the increased flexibility of this invention, are exceedingly difficult to apply, particularly when a relatively high melting, viscous, organic material, such as the above mentioned bituminous material, is used. Mirrors such as illustrated in Fig. 3, having a relatively thick layer of meltable, water impervious adhesive in contact with all points of a flat backing member and the silvered surface of the mirror, may be readily prepared, however, by first coating the silvered surface 3, which may or may not have a varnish previously applied thereto, with a thick layer of flowable adhesive material, such as melted asphalt, and then applying the backing material.

A backing member formed of magnesium oxychloride cement, which may be compounded as desired and applied in plastic form, will compensate for the slight irregularities of the adhesive 5 and has been found to adhere to the soft bituminous material even though it contains the usual amount of water. When the backing is applied in plastic form, assemblies of uniform thickness may be readily prepared by varying the thickness of the backing to effect variations in the thickness of the layer of meltable, binding material 5 due to running, etc.

It is preferable, however, to mold or otherwise prepare the backing material in suitable shape before the mirror is assembled thereon; and it has been found that uniform contact between the adhesive and the mirror, together with high flexibility and strength, may be obtained by providing a backing member with a corrugated or ridged surface for contact with the organic binding material.

In the preparation of mirror assemblies with a backing having a ridged surface, either the ridged surface of the backing material or the silvered surface of the mirror, or preferably both of these surfaces, are coated as by spraying with the melted, waterproof, organic, binding material, and the surfaces pressed together while the material is still in a flowable condition. The grooves between the ridges permit any excess material to flow out of the assembly and the ridges may serve as stops to insure that exactly the desired thickness is obtained in the assembly. Even though the thickness of the binding material 5 which separates the peaks 6 of the ridges from the mirrored surface is comparatively small, it has been found that the effect of the grooves is such as to increase the flexibility so that it equals in effect that of comparatively thicker layer of the same material.

The ridges may be continuous, as shown, extending fully across the assembly, or they may be discontinuous and scattered at random; they should, however, provide passageways for fluid which extend at least to an angle of the assembly. The increased surface area provided by the ridges also increases the adhesion between the bituminous material 5 and the backing member 1.

The backings, applied as above, permit one to obtain the advantage of a plate mirror while making use of less expensive glass, and the mirror has additional advantages in that it is shatterproof and does not have the glassy sound and ring of ordinary mirrors. When the backing member 1 is prepared from a suitable cement, such as magnesium oxychloride cements, which may also contain any desired filling materials, pigments, etc., a frame is unnecessary and the backing may be ground flush with the edges of the mirror. The fastening devices or hangers may be cast in suitable positions in the backing member or the backing member may be drilled, as desired.

Mirror assemblies prepared as above, using either plate or thin glass, have much greater strength and rigidity and are suitable for table tops, etc. They may be placed in moist or damp places with extreme temperature changes without deterioration.

As one of the important uses of my invention is in connection with the reinforcing and backing of mirrors, the invention is illustrated in the drawing and is described in connection with mirrors. It is to be understood, however, that my invention may be used for the backing of surfaces of glass, whether the glass be in the form of sheets, plates, or curved forms, and whether the surfaces of the glass be silvered, as for a mirror, or not.

It is to be understood that variations and modifications of the specific devices herein shown and described for purposes of illustration, may be made without departing from the spirit of the invention.

What I claim is:

1. A mirror assembly comprising a backing member of hardened magnesium oxychloride cement composition, a plane glass mirror with a silvered surface, and a bituminous material having a liquefying point of at least 200° F., said bituminous material forming a layer between and adhering to said cement and said silvered surface.

2. A mirror assembly comprising a backing member of hardened magnesium oxychloride cement composition with a ridged surface, a mirror of plane glass with a silvered surface, and a bituminous material which has a liquefying point of at least 200° F., said bituminous material being disposed between and united to said ridged and said silvered surfaces and being of an average thickness of at least $\tfrac{1}{32}$ of an inch, the portion of said ridges adapted to bear against said surface being a relatively small proportion of the total area of the surface of said backing member.

3. A mirror assembly comprising a backing member of hardened magnesium oxychloride cement composition with a corrugated surface, a mirror of plane glass with a silvered surface, and a bituminous material which has a liquefying point of at least 200° F., said bituminous material being united to and disposed between said corrugated and said silvered surfaces and being of an average thickness of at least $\tfrac{1}{32}$ of an inch.

MAX SKOLNIK.